United States Patent [19]

Nobusawa

[11] 3,829,866
[45] Aug. 13, 1974

[54] DEVICE FOR DETECTING A PRECISE FOCUSING POINT AND AN AUTOMATIC FOCUS ADJUSTING DEVICE

[75] Inventor: Tsukumo Nobusawa, Tokyo, Japan
[73] Assignee: Asahi Optical Co., Ltd., Tokyo, Japan
[22] Filed: May 9, 1973
[21] Appl. No.: 358,525

[30] Foreign Application Priority Data
June 17, 1972   Japan.................................. 47-60024

[52] U.S. Cl..................................... 354/25, 354/60
[51] Int. Cl. .............................................. G03b 3/00
[58] Field of Search .................. 95/44 R, 44 C, 45; 352/139, 140; 353/101; 356/4, 5, 122

[56] References Cited
UNITED STATES PATENTS
3,450,018   6/1969   John, Jr. ................................. 95/45
3,450,883   6/1969   Thomas ........................... 353/101 X
3,494,694   2/1970   Morita ............................ 352/140 X
3,635,551   1/1972   Szymber ............................. 353/101

Primary Examiner—Joseph F. Peters, Jr.
Assistant Examiner—E. M. O'Connor
Attorney, Agent, or Firm—Lane, Aitken, Dunner & Ziems

[57] ABSTRACT

A device for detecting a precise focussing point, particularly for use in a camera, characterized in that the sharpness of focus of a photographic object, detected by a photoelectric element disposed on or in the vicinity of a predetermined focal plane (a focussing or film plane) on an optical axis of a lens or optical path thereof, is converted into a DC signal and a resonant circuit having a variable resonance frequency controlled by said DC signal produces an output indicative of precise focussing when the resonant circuit responds to the oscillation frequency of an oscillation circuit which is adapted to oscillate at a fixed frequency.

9 Claims, 8 Drawing Figures

DEVICE FOR DETECTING A PRECISE FOCUSING POINT AND AN AUTOMATIC FOCUS ADJUSTING DEVICE

BACKGROUND OF THE INVENTION

1. Field of the Invention

This invention relates to a device for detecting a precise focussing point by a photoelectric element disposed on or in the vicinity of a predetermined focal plane (a focussing or film plane) on an optical axis of a lens or an optical path thereof, more particularly to an improvement in a device of the type for use in a camera or the like.

2. Description of the Prior Art

In the past, means for detecting a precise focussing point which has been used in a camera or the like, is such that a photoelectric element, e.g. a photoconductive cell such as cadmium sulfide, is disposed on a predetermined focal plane of a photographic lens, namely, at a position corresponding to a focussing-film plane; focussing information of a photographic object is given to said photoelectric element through a photographic lens; the focussing information is converted into electric current by utilizing the phenomenon that the internal resistance of the photoconductive element of cadmium sulfide, when a lens cylinder is moved back and forth, presents so-called a focussing characteristic curve; and the precise focussing point is detected according to the value of said current.

The conventional device, however, has been accompanied by considerable drawbacks because the change of the internal resistance of cadmium sulfide at the proximity of the maximum value correlated to a precise focussing point is extremely sluggish, it is technically difficult to detect a precise focussing point from the value of resistance, namely, the value of current, thus resulting in inaccurate and not reliable detection of a precise focussing point.

SUMMARY OF THE INVENTION

Accordingly, the principal or the first object of this invention is to provide a device for detecting a precise focussing point, which is free from the drawbacks experienced with the conventional device, and wherein focussing information of a photographic object given to a photoelectric element, such as cadmium sulfide, disposed at a predetermined focal plane of lens, namely, at a position corresponding to focussing-film planes, as in the conventional device, is converted to DC signal, and the DC signal is introduced to a resonance circuit adapted to be controlled by said signal, thereby detecting a precise focussing point by means of output produced when the frequency of said resonance circuit responds to a fixed frequency of said oscillation circuit.

The second object of this invention is to provide a device for detecting a precise focussing point, taking advantage of the fact that when the focus of lens is brought into conformity to the predetermined focal plane (a focussing or film plane) and said predetermined focal plane becomes of a condition corresponding to the maximum value of a focussing characteristic curve of cadmium sulfide, a point on an optical axis spaced a given distance from the predetermined focal plane takes a given value commesurate with the configuration of the focussing characteristic curve. Cadmium sulfide is disposed at a position spaced a given distance from the predetermined focal plane on the optical axis or optical path of a lens, namely, at a position corresponding to that portion of the slope of the focussing characteristic curve, which has the greatest gradient; said point is used as a detecting reference point, so as to produce specific focussing information inherent to said point when the predetermined focal plane and the focussing point of lens become in conformity; resonance frequency of a resonance circuit is controlled by the focussing information thus obtained, whereby a precise focussing point is detected by output generated when a predetermined oscillation frequency of an oscillation circuit and the resonance frequency become responsive to each other, and thus the detection sensitivity at the time of focussing is improved and the detection reliability is enhanced as well.

The third object of the invention is to provide a device for detecting a precise focussing point, wherein for attaining the first and second objects described, a compensation circuit is included, for compensating for the luminance change of the photographic object, so as to provide output unaffected thereby.

The fourth object of the invention is to provide an automatic focus adjusting device, wherein a photoelectric cell such as cadmium sulfide provided at a point corresponding to a sloped portion of a focussing characteristic curve described in the second object is utilized to automatically adjust a focus.

These and other objects of this invention will be apparent from the reading of the ensuing detailed description of embodiments of the invention, with reference to the drawings.

DESCRIPTION OF THE PREFERRED EMBODIMENTS

Figure 1:
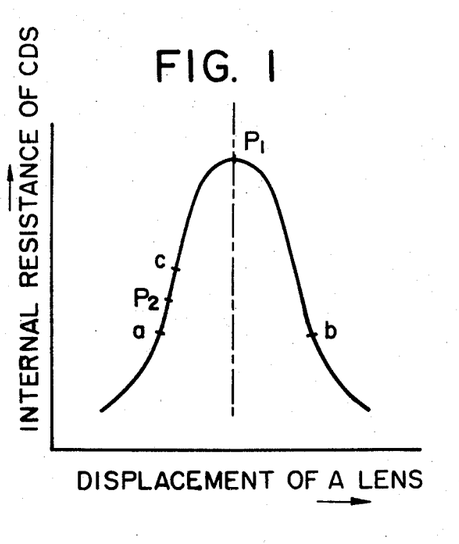
FIG. 1 is a plot showing a focussing characteristic curve of cadmium sulfide which is a photoconductive element.
Figure 2:
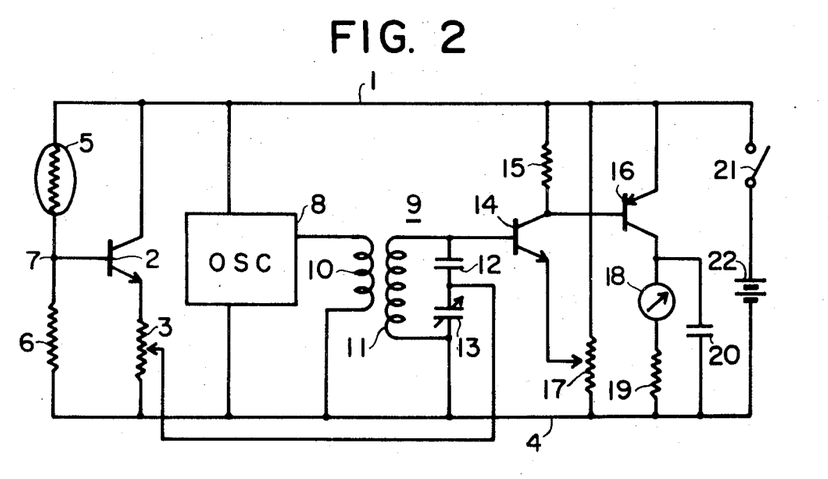
FIG. 2 is a circuit diagram of the first embodiment of the invention wherein a maximum value on the focussing characteristic curve of cadmium sulfide is utilized.

Referring now to FIG. 1 in which there is shown a focussing characteristic curve of cadmium sulfide serving as a photoconductive element which is selected out of photoelectric elements, the mid-point P1 on the curve represents the maximum value which represents a precise focussing point of the focal point of a photographic object passing through a lens and the predetermined focal plane in conformity thereto, while the points a and b respectively show positions referred to as a the focused point ahead of the film plane and the focused point to the rear of the film plane, either of which is optionally determined. Turning to FIG. 2 illustrating the first embodiment of a device for detecting a precise focussing point, which embodiment is so arranged as to utilize the maximum value of the focussing characteristic curve of cadmium sulfide as described, the collector of transistor 2 is connected to a positive bus 1 and the emitter thereof is connected through a variable resistor 3 to a negative bus 4. Between the positive bus 1 and the negative bus 4, there is connected a series circuit consisting of a resistor 6 and cadmium sulfide 5 for use in detecting focussing informations, which cadmium sulfide is disposed on a predetermined focal plane on a optical axis of lens or an optical path thereof, namely, at a position corresponding to a focussing or film plane. A junction point 7 of said series circuit is connected to the base of the transistor 2. Shown at 8 is a fixed frequency oscillation circuit consisting of LC or a crystal oscillator or the like, and an oscillation output end of the oscillation circuit 8 is connected to one end of primary coil 10 in a resonance circuit 9. The other end of the primary coil 10 is connected to the negative bus 4, such that oscillation outputs are induced to a secondary coil 11 under the induction thereof. The secondary coil 11 is connected to a series circuit consisting of a capacitor 12 and a variable capacity diode 13, the secondary coil having one end connected to the base of a transistor 14 and the other end connected to the negative bus 4. A sliding element of the variable resistor 3 is connected to the variable capacity diode 13, whereby voltage generating across said sliding element and negative bus 4 is impressed onto the variable capacity diode 13 for varying the capacity of said diode 13, to thereby change resonance frequency of the resonance circuit 9. A collector of transistor 14 is connected through a resistor 15 to the positive bus 1 as well as to the base of a transistor 16. An emitter of the transistor 14 is connected to a sliding element of a variable resistor 17 used for setting a conductive level of the transistor 14 which is interconnected between the positive and negative buses 1 and 4. The emitter of a transistor 16 is connected to the positive bus 1 and the collector of the transistor 16 is connected to the negative bus 4 via a meter 18, such as an ammeter for use in confirming the detection of a precise focussing point, and a resistor 19 connected in series therewith. Shown at 20 is a by-pass capacitor, at 21 a switch and at 22 a source of DC power.

Operations of the device for detecting a precise focussing point according to the first embodiment are as follows.

Firstly, when the switch 21 is closed, then the fixed frequency oscillation circuit 8 starts to oscillate at a predetermined frequency. The oscillation signal produced is fed to the primary coil 10 of the resonance circuit 9 and then, induced to the secondary coil 11. The resonance circuit 9 is adapted to resonate with said oscillation signals only when the focussing information reading of the precise focussing point is given, but will not resonate when defocussing information rather than the aforementioned precise focussing informations is given. Accordingly, in case the point of the meter 18 for indicating the detection of a precise focussing point does not move, the lens can be moved back and forth manually or by any other suitable means, so as to focus the image of the photographic object on cadmium sulfide 5, until the internal resistance of cadmium sulfide becomes the maximum value as shown by the point $P_1$ in FIG. 1. By the focussing information thus obtained, the emitter current of transistor 2 decreases to lower the voltage being impressed on the variable diode, hence the resonance frequency of the resonance circuit 9 becomes lowered to conform the oscillation frequency of the fixed frequency generation circuit 8.

Figure 3:
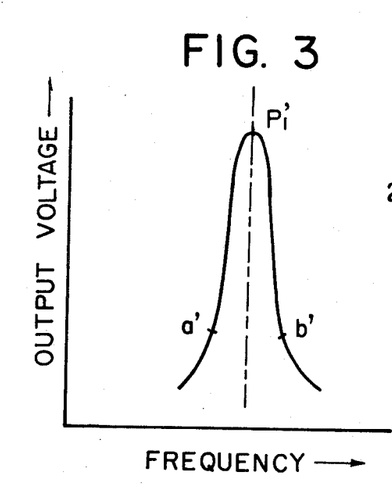
FIG. 3 is a plot of an oscillation characteristic curve of the first embodiment.

Thus, the oscillation signal is converted by the resonance circuit 9 to resonance voltage shown at the point P1 in FIG. 3, to be impressed on to the base of transistor 14. The transistor 14 is arranged to become conductive by means of the variable resistor only when resonance voltage exceeds a certain level. Accordingly, the transistor 14 is rendered conductive by the resonance voltage impressed on the base thereof, and the resonance voltage, namely, the focussing informations, is amplified by the transistor 16, feeding electric current to the meter 18 for use in the detecting a precise focussing point, to thereby move the point of the meter 18.

The precise focussing point can be confirmed according to the moved point of the meter 18 and the focussing informations can be taken out from the collector of transistor 16, so as to be used as a focussing signal.

The value Q of the aforementioned resonance circuit 9 is obtained from the formula $Q=WL/R$, as is well known, and if values of inductance L and resistance R of coil are determined, then the higher resonance frequency, the better will be the result logically. Thus, if the value Q is great, the resonance characteristics of a single peak nature will be obtained. This greatly increases the difference in value between the focused points $a'$ and $b'$ ahead of an to the rear of the film plane, respectively, and the resonance point $P'_1$ representing a precise focussing point $P_1$, hence the detection of a precise focussing point may be ensured.

Figure 4:
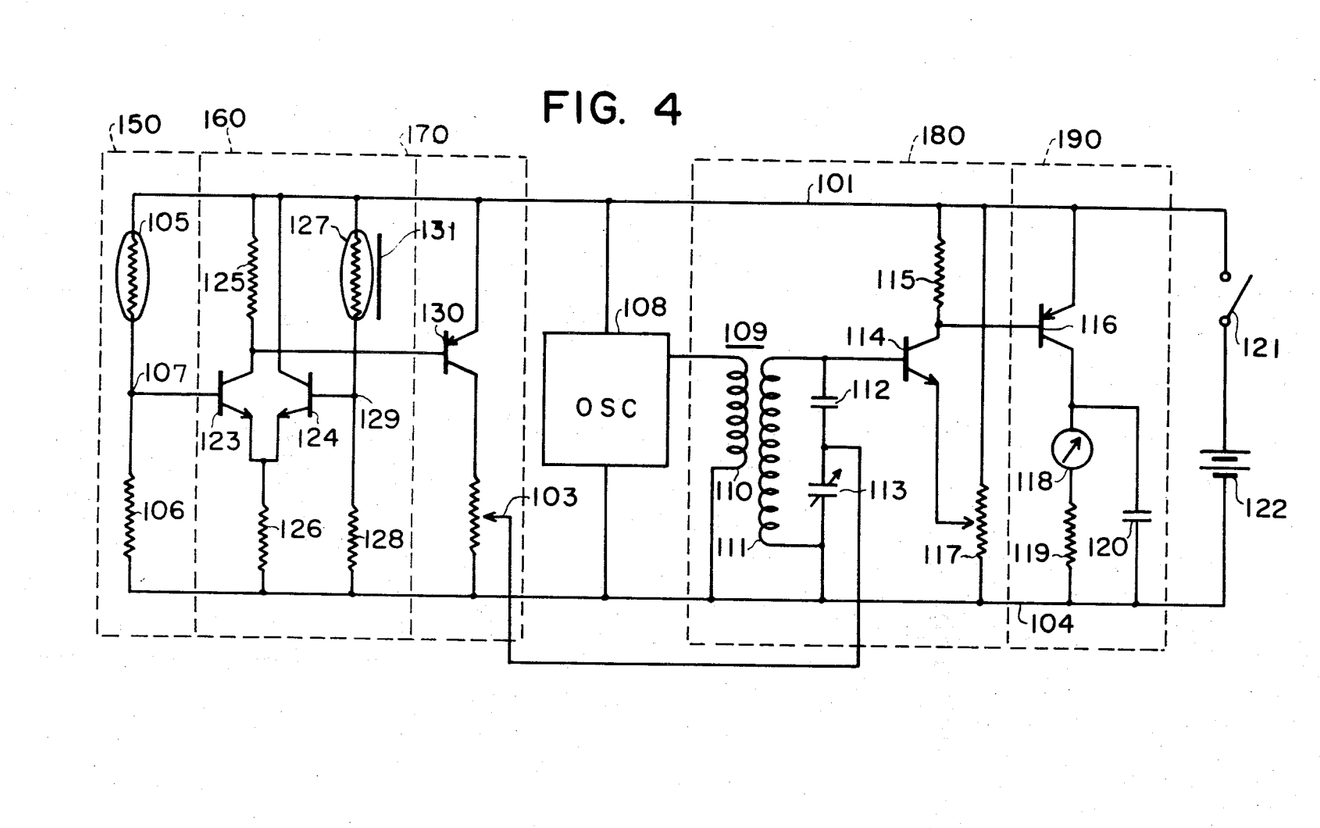
FIG. 4 is a circuit diagram of the second embodiment.

The capacity change of the variable capacity diode is comparatively small, yet because the resonance frequency of the resonance circuit is high, a wide range of resonance frequency is produced, even if the capacity variation is small. In the embodiment described, it so happens that there are cases where the detection of a precise focussing point is difficult when a change in the luminance of the object occurs to some extent. For overcoming such a difficulty, a compensation circuit is incorporated in the second embodiment as shown in FIG. 4.

In the other embodiments to be discussed next, the three-digit reference numbers employed in FIGS. 4, 5, 6, 8 and 9 are organized such that the first digit identifies the embodiment (hundreds digits 1 through 5) and the second and third digits together always represent the same component. For example, the numerals 5, 105, 205, 305, 405 and 505 represent the photodetector element employed in different embodiments.

In the second embodiment, a differential amplifier is constituted by transistors 123, 124 and resistors 125, 126. A base of transistor 123 is connected to a common junction point 107 of cadmium sulfide 105 for use in detecting focussing information and the resistor 106, while the base of transistor 124 is connected to a common junction point 129 of a series circuit, consisting of cadmium sulfide 127 for detecting the luminance of the object, and a resistor 128. The series circuit is interposed between the positive and negative buses 101 and 104. A collector of transistor 123 is connected to the base of a transistor 130 for producing control voltage being fed to the variable capacity diode 113 of the resonance circuit 109, while the emitter of the latter is connected to the positive bus 101, and a collector thereof is connected via the variable resistor 103 to the negative bus 104. In addition, a light diffusing plate 131 is provided in front of the cadmium sulfide 127. Furthermore, in FIG. 4, designated at 150 is a focussing information detection circuit, at 160 a luminance compensation circuit, at 170 a buffer amplification circuit, at 180 a resonance circuit and at 190 a precise focussing point indicator.

Referring to the operations of the device according to the second embodiment, assume that the luminance level of the object is lowered after the precise focussing point has been detected at a given luminance level, then the internal resistance of cadmium sulfide 105 will increase, thereby lowering the base potential of transistor 123. In the meantime, the internal resistance of cadmium sulfide 127 will also increase, hence the base potential of transistor 124 will drop. Consequently, the differential amplifier becomes energized to increase the collector current of transistor 123, and then to increase the base current of transistor 130, with the result of the voltage drop at the variable resistor 103 down to the value of voltage equivalent to that in the case of the fixed level of luminance. However, resonance frequency of the resonance circuit 109 ensures the positive direction of the focussing information even if the luminance of the object is lowered. On the contrary, in the case of the brilliance of the object being increased, the operation aforementioned will be reversed, to thereby achieve reliable detection of the focussing information, like the former case.

Figure 5:
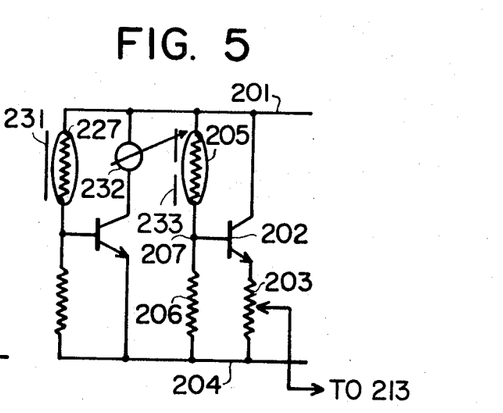
FIGS. 5 and 6 are diagrams of photographic-object-luminance-compensation-circuits, respectively.

In FIG. 5, there is shown another embodiment of the compensation circuit for use in compensating the luminance change of the object. The construction of the device of FIG. 5 is such that in case of the luminance of the object being changed, the change in luminance is sensed by cadmium sulfide 227, and a diaphragm 233 located in front of cadmium sulfide 205 is controlled, depending on the luminance, by the driving torque of a meter 232, so as to maintain voltage being impressed on the variable capacity diode 213 usually constant, whereby the precise focussing information is detected, irrespective of the change of luminance of the object.

Figure 6:
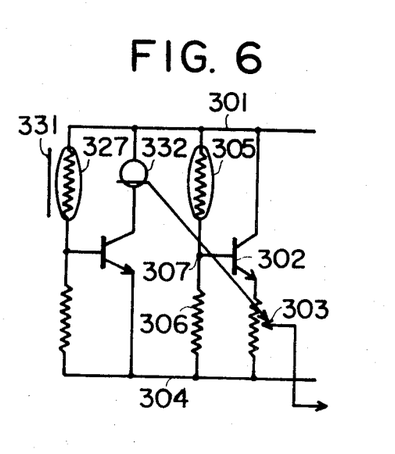

A further embodiment of a compensation circuit for use in the luminance change of the object is shown in FIG. 6, wherein the sliding element of variable resistor 303 is driven by the driving torque of the meter 332, and the voltage to be impressed onto the variable capacity diode is maintained constant, as in the case with the embodiment of FIG. 5, so as to produce the same detecting effect as in the foregoing embodiments.

Figure 7:
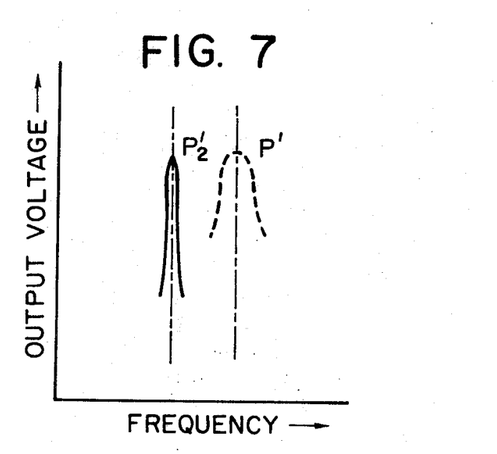
FIG. 7 is a resonance characteristic curve in the third embodiment.

In the embodiments described thus far, cadmium sulfide, to which the focussing information of the object is to be given, is disposed at a predetermined focal plane, namely, at a position corresponding to the focussing or film plane, so as to utilize the point $P_1$ having the maximum value on the focussing characteristic curve as shown in FIG. 1. Such cadmium sulfide can also be disposed at a position corresponding to the point $P_2$ existing on that portion of slope of the focussing characteristic curve which presents the greatest gradient (slope) of the internal resistance, in other words, at a position spaced a given distance from the predetermined focal plane on the optical axis or optical path of lens. In this case, the point $P_2$ is used as the detecting reference point to produce a specific focussing information at said point when the predetermined focal plane and the focussing point of lens become in conformity to each other. The frequency of the resonance circuit is controlled by the above focussing information, as shown in the plot of FIG. 7, and a signal produced when said frequency responds to a given oscillation frequency produced by an oscillation circuit adapted to resonate with the frequency including the frequencies at the point $P_2$ and its proximity, is taken out as a precise focussing signal. Such arrangement is realized in the third embodiment, which, needless to say, serves to greatly improve the detection sensitivity when the focussing point is brought in conformity, as compared with the embodiments set forth in the foregoing.

Throughout the aforementioned embodiments and in the embodiment which follows, so far as the variable capacity diode 13 is concerned, it is possible to vary the capacity of a variable capacity for varying the resonance frequency, or to use means for changing inductance or a mechanically operable capacitor, and it is simply a matter of design which one of the means is adopted.

Figure 8:
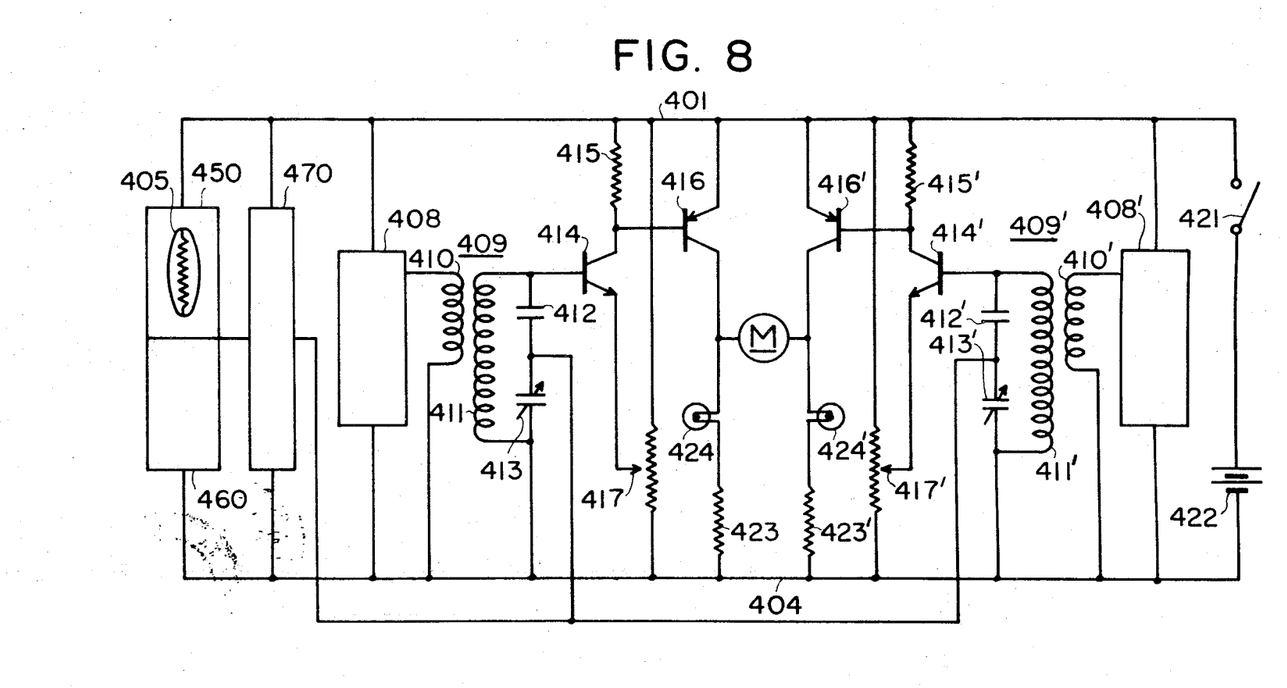
FIG. 8 is a circuit diagram of a first embodiment of an automatic focus adjusting device according to this invention; and, FIG. 9 is a circuit diagram of another embodiment of the automatic focus adjusting device.

In FIG. 8, the automatic focussing device is so arranged that cadmium sulfide 405 is disposed at a position spaced a given distance from a predetermined focal plane (a foucssing or film plane) on an optical or optical path of lens, namely, at a position corresponding to the point $P_2$ on the focussing characteristic curve shown in FIG. 1, so as to detect the point $P_1$ representing the precise focussing point, thereby automatically adjusting the focus.

The construction of the device is such that resonance frequency of the first resonance circuit 409 selects a frequency responsive to oscillation frequency of the fixed frequency oscillation circuit 408, and the resonance frequency of the second resonance circuit 409' selects frequency responsive to the oscillation frequency of the second fixed frequency oscillation circuit 408'. These resonance circuits are so adapted that when cadmium sulfide has a given resistance, in other words, the image of the object passing through the lens is precisely focused on the predetermined focal plane, neither of two resonance circuits resonates, while when the image of the of the object is shifted frontwardly a certain distance from the predetermined focal plane, the first resonance circuit 409 will resonate, and when the image is shifted rearwardly, the second resonance circuit 409' will resonate. Designated at 424 and 424' are resonance indicating lamps, at M a servo-motor for actuating a mechanism for moving a lens back and forth, and at 423 and 423' resistors.

As soon as the switch 421 is closed, the fixed frequency oscillation circuits 408 and 408' commence to oscillate to supply the oscillation outputs to the first and second resonance circuits 409 and 409'. However, both resonance circuits 409 and 409' are still in the non-resonant state, because the photographic lens in the camera is usually set to a position ready for photographing an infinite object. Accordingly, the lamps 424, 424' are not lit, and the servo-motor M remains in the stationary condition.

Then, the lens is moved forward manually, so as to focus the image of the object passing through the lens on the predetermined focal plane. Once the image is focused on the predetermined focal plane, it results that both the first and the second resonance circuits 409 and 409' are maintained in the non-resonant state. Thereafter, if the photographic object comes near to the side of predetermined focal plane, the first resonance circuit 409 resonates to render the lamp 424 on, as well as to cause the rotation of the servo-motor M, and then the lens is shifted in a direction to cause the image of the object to be precisely focused on the predetermined focal plane. On the contrary, if the object is averted from the predetermined focal plane, the second resonance circuit 409' resonates so as to light the lamp 424', as well as to actuate the servo-motor M in the reverse direction to retract the lens until the image of the object passing through the lens is precisely focused on the predetermined focal plane. In either cases, the lamps are adapted to be turned off when the servo-motor M is stopped. Resonance circuits in this embodiment are so arranged that once the image of the object passing through the lens has been precisely focused on the predetermined focal plane, and thereafter, if the object comes near to the side of predetermined focal plane, the first resonance circuit 409 resonates, while if said object is spaced a distance from the plane, the second resonance circuit 409' in turn resonates. As an alternative, it is possible to set the resonance frequency by reversing the way to resonate, and it is also possible to avoid the use of a single fixed frequency oscillation circuit 408', but to use oscillation circuit 408 only, by differentiating the capacity between the capacitors 412 and 412' or the capacity between the variable capacity diodes 413 and 413'.

Figure 9:
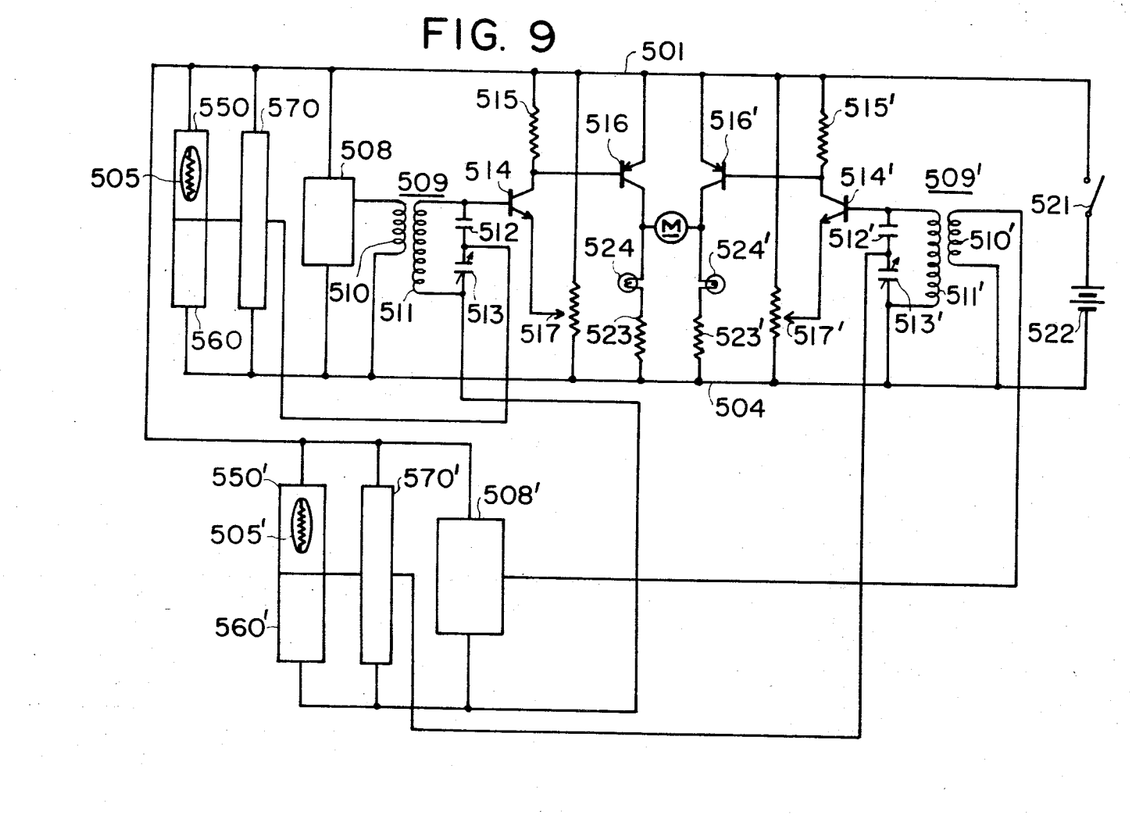

The device shown in FIG. 9 is another embodiment of the automatic focussing device illustrated in FIG. 8.

In FIG. 9, the construction of the automatic focussing device is such that two pieces of cadmium sulfide 505 and 505' are provided at positions spaced a given distance from a predetermined focal plane (a focussing or film plane) on the optical axis or optical path of lens, namely, at the positions corresponding to the points $a$ and $c$, on the focussing characteristic curve shown in FIG. 1, so as to detect the point $P_1$ representing a precise focussing point, thereby automatically adjusting the focus. The device of FIG. 9 is distinguishable from that of FIG. 8 in that two pieces of cadmium sulfide are incorporated in the former, instead of a single cadmium sulfide in the latter.

In this embodiment, resonance frequency of the first resonance circuit 509 is set to a frequency which responds with oscillation frequency of the fixed frequency oscillation circuit 508, when the resistance of cadmium sulfide 505 presents a value of resistance higher to some extent than a specific value of resistance and presents a value of resistance coming immediately closer to said specific value of resistance. The resistance of cadmium sulfide 505, when the image of the object passing through the lens is precisely focused on the predetermined focal plane (a focussing or film plane), is referred to as a specific value of resistance. On the other hand, the resonance frequency of the second resonance circuit 509' is selected to such a frequency as responses to oscillation frequency of the fixed frequency oscillation circuit 508' when the resistance of cadmium sulfide 505' presents the value lower to some extent than the specific resistance and presents the value immediately closer to the specific value of resistance. In this case, the resistance of cadmium sulfice 505', when the image of the object is precisely focused on the predetermined focal plane (a focussing-film planes), is referred to a specific value of resistance.

In operation, if the switch 521 is closed, the lamps 524 and 524' are left in the off state, and the servo-motor M remains inoperative, like in the aforementioned embodiment of the type. Then, also in this embodiment, the lens is manually moved forward so as to focus the image of the object passing through the lens precisely on the predetermined focal plane. At this stage, the first and second resonance circuits 509 and 509' are maintained inoperative. Subsequently, if the object comes near to the side of predetermined focal plane, the second circuit 509' becomes resonant, to thereby light the lamp 524 and actuate the servo-motor M, and the lens is shifted in a direction to cause the image of the object to be precisely focused on the predetermined focal plane. If the lamp 524 is turned off and the object is averted from the predetermined focal plane, the first resonance circuit 509 will resonate to turn the lamp 524' on as well as to reverse the rotation of the servo-motor M, and then the lens will be retracted. As soon as the image of the object is focused, the rotation of the servo-motor M is stopped and the lamp 524' is turned off.

Resonance circuits in this embodiment are so arranged that after the image of the object passing through the lens has been focused on the predetermined focal plane, and thereafter, when the object comes near to the side of predetermined focal plane, the second resonance circuit 509' will resonate, and when the object averted from the predetermined focal plane, the first resonance circuit 509 will become resonated. It is permissible to reverse the way of setting resonance frequency in such a way that the first resonance circuit 509 will resonate when the object comes near to the side of predetermined focal plane, and when the object is averted from the side of predetermined focal plane, the second resonance circuit 509' will resonate.

It will be apparent that these two automatic focussing devices are employable in case where the focussing of the image must be effected, following the object shifting as in the cine-camera, with the result of the extremely appreciable advantages. Otherwise, the principle of these devices may be utilized in a single lens reflex camera. In this case, it is satisfactory only to provide a front pin indicating lamp and a rear pin indicating lamp within a view finder unit, instead of the servo-motor, since either of said lamps is turned on by manually moving the lens back and forth. With such a provision, the focussing point on the lens will be confirmed and the focussing is effected with ease. This provides the camera easy to handle even by a beginner or a child.

According to the devices of this invention, such advantages are provided that:

1. By the provision of that source of generating a fixed information such as from a fixed frequency oscillator or the like which is unaffected by the change of the focussing informations, a desired fixed information can be selected, and this increases the degree of freedom at the time of design and production and greatly improves the stability of the device;

2. since the position of a photoelectric element is optional, and that portion of the photoelectric element, which is great in the changing rate in the resistance, is utilized, the sensitivity of detecting the precise focussing point is greatly improved;

3. since the post-detection treatment of the focussing information provided by the photoelectric element is effected by using alternating current, this greatly reduces the influences due to the ambient temperature and the voltage change at the source of potential, as compared with the conventional device using DC, and this ensures the positive detection of a precise focussing point; and, 4. since the position of the photoelectric element is optional, not only the device for detecting the precise focussing point but also the automatic focussing device is simple in construction.

It is apparent that this invention should not be limited to the embodiments described in the foregoing, and various changes and modifications may be made without departing from the spirit and scope of the claims. This invention may be used for other purposes and realized in other embodiments, where its features are advantageous.

What is claimed is:

1. A device for detecting a precise focussing point of a lens comprising:
   a photoelectric element disposed in fixed relationship to a predetermined focal plane in the optical path of said lens, said element producing an output indicative of the sharpness of focus;
   a fixed frequency oscillator;
   a resonant circuit driven by said oscillator including a variable resonant frequency-influencing component;
   means for varying said frequency-influencing component in accordance with the output of said photoelectric element, the fixed frequency of said oscillator being chosen to correspond to the resonant frequency of said resonant circuit when said lens is in the correct position to focus images at said predetermined focal plane; and output means responsive to the output level of said resonant circuit for indicating the detection of said precise focussing point.

2. A device for detecting a precise focussing point as defined in claim 1 wherein said device further comprises;
   a compensation circuit for maintaining the focussing information unchanged, even if the luminance of the photographic object is varied.

3. A camera having a lens and a focal plane and including a device for detecting a precise focussing point as defined in claim 2.

4. A camera having a lens and a focal plane and including a device for detecting a precise focussing point of said lens as defined in claim 1.

5. A device as defined in claim 1, wherein said photoelectric element is disposed at said focal plane.

6. A device as defined in claim 1, wherein said photoelectric element is spaced a predetermined distance away from said focal plane.

7. A device as claimed in calim 6, wherein said predetermined distance corresponds to a point having the greatest gradient on the characteristic curve representing lens displacement versus output of said element, said element being a photoconductive element.

8. An automatic focussing system for a lens system comprising:
   a photoelectric element disposed in the optical path of said lens system in fixed relationship to a predetermined focal plane, said element producing an output indicative of the sharpness of focus;
   a pair of fixed frequency oscillators;
   a pair of resonant circuits driven respectively by said oscillators and each including a variable, resonant frequency-influencing component;
   means for varying said frequency-influencing component of said resonant circuits in accordance with the output of said photoelectric element, the fixed frequency of one of said oscillators being chosen to correspond to the resonant frequency of the respective resonant circuit when said lens is in a position to focus images to one side of said focal plane, the fixed frequency of the other one of said oscillators being chosen to correspond to the resonant frequency of the other resonant circuit when said lens is in position to focus images on the other side of said focal plane; and
   drive means responsive to the outputs of said resonant circuits to shift said lens accordingly.

9. An automatic focussing system for a lens, comprising:
   a pair of photoelectric elements disposed in the optical path of said lens at different positions in fixed relationship to a predetermined focal plane;
   a pair of fixed frequency oscillators;
   a pair of resonant circuits driven respectively by said oscillators and each including a variable, frequency-in-fluencing component;
   means for varying said components respectively according to the outputs of said photoelectric elements, the frequency of said oscillators being chosen to correspond to the resonant frequencies of said resonant circuits when said lens is in positions corresponding respectively to the positions of said photoelectric elements; and
   drive means responsive to the outputs of said resonant circuits for shifting said lens accordingly.

* * * * *